United States Patent [19]

Tominari et al.

[11] Patent Number: 4,906,329
[45] Date of Patent: Mar. 6, 1990

[54] FLASH-DRYING PROCESS FOR A SOLVENT SOLUTION OF A POLYMER OR COPOLYMER

[75] Inventors: Kenichi Tominari; Yuzi Miura, both of Ichihara; Kunio Furutachi, Tokyo; Yoshihiro Tsukamoto, Ichihara, all of Japan

[73] Assignee: Mitsui Petrochemical Industries, Ltd., Tokyo, Japan

[21] Appl. No.: 62,423

[22] Filed: Jun. 16, 1987

Related U.S. Application Data

[63] Continuation of Ser. No. 831,121, Feb. 21, 1986, abandoned, which is a continuation of Ser. No. 521,450, Sep. 8, 1983, abandoned, which is a continuation of Ser. No. 369,824, Apr. 18, 1982, abandoned, which is a continuation of Ser. No. 194,917, Oct. 7, 1980, abandoned.

[30] Foreign Application Priority Data

Oct. 9, 1979 [JP] Japan .................. 54-130162

[51] Int. Cl.$^4$ ..................... B01D 3/06; C08F 6/06
[52] U.S. Cl. ..................... 159/47.1; 159/2.1; 159/16.1; 159/16.3; 203/49; 203/88; 203/95; 528/500; 528/501
[58] Field of Search ............... 159/DIG. 10, DIG. 20, 159/2.1, 2.2, 47.1, 16.3, 16.1; 528/501, 500; 203/88, 49, 95, 92

[56] References Cited

U.S. PATENT DOCUMENTS

| | | | |
|---|---|---|---|
| 3,195,613 | 7/1965 | Hawkins | 159/DIG. 10 |
| 3,197,453 | 7/1965 | Harban | 159/DIG. 10 |
| 3,262,922 | 7/1966 | Payne | 159/DIG. 10 |
| 3,586,089 | 6/1971 | Moto et al. | 159/2 |
| 3,605,872 | 9/1971 | Brault | 165/1 |
| 3,683,511 | 8/1972 | Johnson et al. | 34/9 |
| 3,941,664 | 3/1976 | Scoggin | 203/88 |
| 3,956,060 | 5/1976 | Scoggin | 203/88 |

FOREIGN PATENT DOCUMENTS 1587989 4/1981 United Kingdom .
1590532 6/1981 United Kingdom .

Primary Examiner—Wilbur Bascomb
Attorney, Agent, or Firm—Sherman and Shalloway

[57] ABSTRACT

In a flash-drying process which comprises flashing a solvent solution of a polymer or copolymer maintained at an elevated temperature and pressure into a flashing zone maintained at a lower pressure than the pressure of the solvent solution through a means for releasing said elevated pressure, thereby evaporating and separating the solvent from the solvent solution, the improvement wherein an inert stripping agent is fed into a flow of the solvent solution at any point between said pressure-releasing means and said flashing zone.

5 Claims, 1 Drawing Sheet

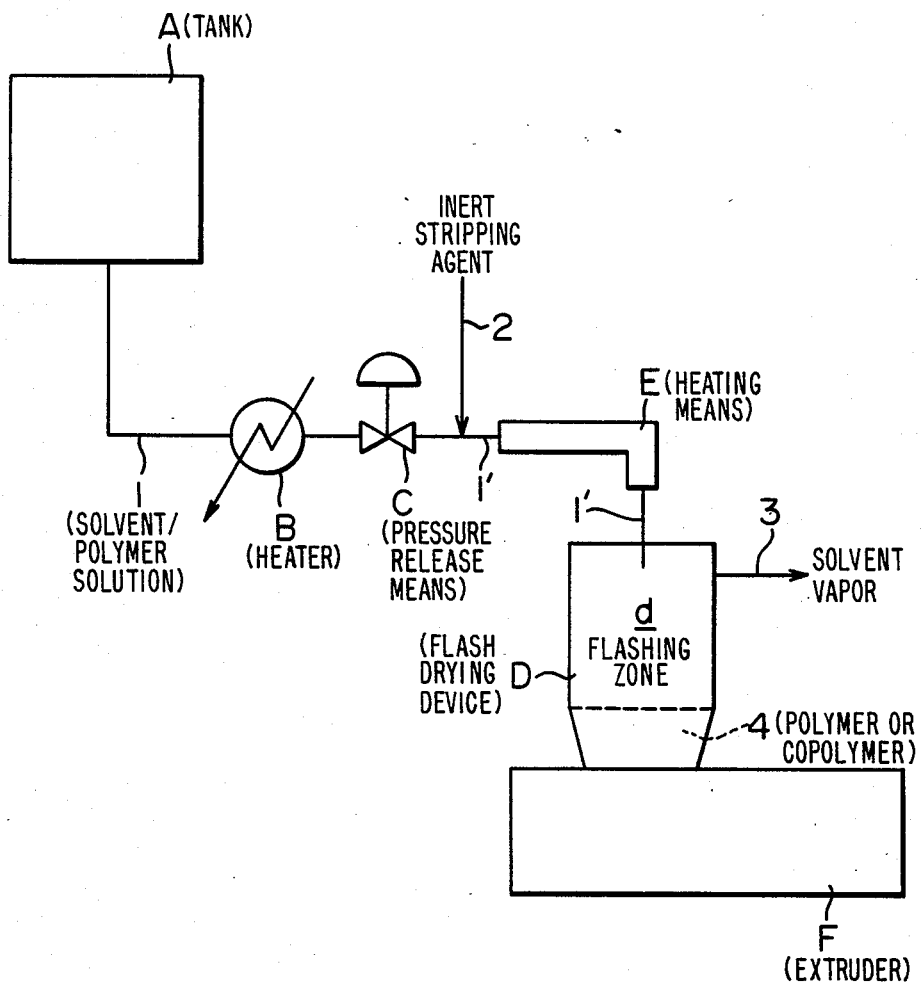

FLASH-DRYING PROCESS FOR A SOLVENT SOLUTION OF A POLYMER OR COPOLYMER

This application is a continuation of application Ser. No. 831,121 filed Feb. 21, 1986, which in turn is a continuation of application Ser. No. 521,450 filed Sept. 8, 1983, which in turn is a continuation of application Ser. No. 369,824 filed Apr. 18, 1982, which in turn is a continuation of application Ser. No. 194,917 filed Oct. 7, 1980, all of which are now abandoned.

This invention relates to an improvement in and relating to a flash-drying process which comprises flashing a solvent solution of a polymer or copolymer maintained at an elevated temperature and pressure into a flashing zone maintained at a lower pressure than the pressure of the solvent solution, thereby evaporating and separating the solvent from the solvent solution. According to this process, the solvent can be evaporated and separated from the solvent solution at an increased ratio of solvent removal by an easy operation without involving troubles such as the thermal degradation and gellation of the polymer or copolymer.

More specifically, this invention relates, in a flash-drying process which comprises flashing a solvent solution of a polymer or copolymer maintained at an elevated temperature and pressure into a flashing zone maintained at a lower pressure than the pressure of the solvent solution through a means for releasing said elevated pressure, thereby evaporating and separating the solvent from the solvent solution, to the improvement wherein an inert stripping agent is fed into a flow of the solvent solution at any point between said pressure-releasing means and said flashing zone.

There has been known and commercially practised a flash-drying process which comprises flashing a solvent solution of a polymer or copolymer such as an elastomeric polymer or copolymer or a plastic resin maintained at an elevated temperature and pressure into a flashing zone maintained at a lower pressure than the pressure of the solvent solution through a means for releasing said elevated pressure, for example a pressure-reduction valve, from a flashing nozzle or the like, thereby evaporating and separating the solvent contained from the solvent solution. Improved processes and apparatuses have also been proposed which are especially suitable for the removal of a solvent from a solution of an elastomeric or rubbery polymer or copolymer in the solvent which removal is especially difficult in the practice of the aforesaid flash-drying process.

For example, such an improved process and apparatus were suggested in U.S. Pat. No. 3,586,089 (corresponding to Japanese Patent Publication No. 39101/70; West German Patent No. 1,770,318; British Patent No. 1,209,205; Canadian Patent No. 901,469; Dutch Patent No. 138,304; French Patent No. 1,593,503; and to Italian Patent No. 832,324).

In these prior art processes, the ratio of solvent removal attained is at most about 5% by weight. If in an attempt to increase the solvent removal ratio, the temperature of the solvent solution of a polymer or copolymer at an elevated temperature and pressure is increased further, the undesirable thermal degradation of the polymer or copolymer and the formation of a gel occur, and the resulting polymer or copolymer cannot be free from contamination.

Investigations of the present inventors have shown that in the case of a solvent solution of an ethylene/-propylene/diene copolymer rubber, the solvent can be decreased in content only to about 5 to 7% by weight in order to avoid the trouble of thermal degradation and gel formation, and that in the case of a diene-type rubber such as polyisoprene or polybutadiene, the content of the solvent can be reduced to about 20% by weight at best because such a rubber has lower thermal stability.

The present inventors made investigations in order to develop an improved process for flash-drying a solvent solution of a polymer or copolymer maintained at an elevated temperature and pressure, which can be performed commercially advantageously by an easy operation at an increased solvent removal ratio without involving troubles such as the thermal degradation of the polymer or copolymer and the formation of a gel.

These investigations have led to the discovery that when in flashing a solvent solution of a polymer or copolymer maintained at an elevated temperature and pressure into a flashing zone maintained at a lower pressure than the pressure of the solvent solution through a means for releasing the elevated pressure, for example a pressure-reduction valve, an inert stripping agent, preferably water or steam, is fed into a flow of the solvent solution at any point between the pressure-releasing means and the flashing zone, the solvent can be evaporated and separated from the solvent solution to a solvent content of less than about 5% by weight, say about 2 to 3% by weight, without involving undesirable troubles such as the thermal degradation of the polymer or copolymer and the formation of a gel.

It is an object of this invention therefore to provide an improved process for flash-drying a solvent solution of a polymer or copolymer to evaporate and separate the solvent therefrom at an increased removal ratio.

The above and other objects of this invention along with its advantages will become apparent from the following description.

Preferred embodiments of the process of this invention are described below in detail with reference to the accompanying drawing which is a simplified diagram for illustrating the process of this invention.

In the drawing, a solvent solution of a polymer or copolymer sent from a tank A through a line 1 is heated in a heater B under pressure. The solvent solution of a polymer or copolymer which is thus maintained at an elevated temperature and pressure is flashed into a flashing zone d, being under a low pressure than the pressure of the solvent solution, of a flash-drying device D through a line 1' optionally provided with a heating means E via a means C for releasing the elevated pressure, such as a pressure-reduction valve. As a result, the solvent in the solvent solution is evaporated and separated. The separated solvent vapor is recovered through a line 3. In the meantime, the polymer or copolymer 4 is accumulated at the bottom of the flash-drying device D, and recovered. In the drawing, an extruder F is fitted to the bottom portion of the flash-drying device D for subsequent polymer processing.

According to the process of this invention, an inert stripping agent is fed into a flow of the solvent solution at any point between the pressure-releasing means C and the flashing zone d, for example at a point shown by line 2 in the drawing.

The inert stripping agent may be a member selected from the group consisting of water, nitrogen gas, carbon dioxide gas, hydrocarbons having 1 to 4 carbon atoms, and mixtures of at least two of these. Examples of the hydrocarbons are methane, ethane, propane, butane, isobutane, ethylene, propylene, 1-butene, isobutene and 2-butene. These hydrocarbons should have a lower boiling point than the solvent in the solvent solution of a polymer or copolymer.

Water is most preferred as the inert stripping agent. Water has the best effect of removing the solvent in the solvent solution. Moreover, use of water has the advantge that the steam which is removed together with the solvent from the flashing zone through line 3 can be easily condensed and separated from the solvent in a device for recovering the solvent.

The site of feeding the inert stripping agent into the flow of the solvent solution may be properly selected. Preferably, it is any point between the means C and a point corresponding to about one-fourth of the distance from the means C and the inlet of the flashing zone d. It is especially preferred that the feeding site be provided immediately downstream of the means C or in its vicinity. For example, when the heating means E is provided, the feeding site is preferably provided between the means C and the heating means E.

The amount of the inert stripping agent fed in the process of this invention can be properly selected depending upon the type of the stripping agent, the type of the solvent solution of a polymer or copolymer, etc. For example, the suitable amount of the stripping agent is at least about 5 mole%, preferably at least about 10 mole%, based on the total amount of the solvent in the solvent solution. There is no particular upper limit to the amount of the stripping agent, but from an economical viewpoint, the upper limit may, for example, be about 300 mole%.

Preferably, the inert stripping agent is pre-heated. The temperature of the heated inert stripping agent is, for example, about 100° to about 250° C. It is especially preferred that the temperature of the stripping agent be equal or close to the temperature of the flow of the solvent solution fed.

The heating means E which may be optionally provided downstream of the means C in order to maintain the solvent solution of a polymer or copolymer at the desired temperature may be any suitable heating device such as a jacket-type heat exchanger or a multi-tube-type heat exchanger.

The polymer or copolymer in the solvent solution to be treated by the process of this invention may be any polymer or copolymer such as elastomeric polymers or copolymers or plastic polymer or copolymer resins. The process of this invention can be especially favorably applied to a solvent solution of an elastomeric polymer or copolymer, the removal of the solvent from such a solvent solution being especially difficult.

Examples of the elastomeric polymers or copolymers include ethylene/alpha-olefin copolymer rubbers such as an ethylene/propylene copolymer rubber and an ethylene/butene copolymer rubber; propylene/alpha-olefin rubbers such as a propylene/butene copolymer rubber; ethylene/alpha-olefin/diene copolymer rubbers such as an ethylene/propylene/dicyclopentadiene copolymer rubber and an ethylene/propylene/5-ethylidene-2-norbornene copolymer rubber; diene rubbers such as polyisoprene, polybutadiene, chloroprene rubber, styrene/butadiene rubber (SBR) and acrylonitrile/butadiene rubber (NBR); and butyl rubbery.

Examples of the plastic resins include olefinic plastic resins such as polyethylene, isotactic polypropylene, atactic polypropylene, poly(1-butene) and poly(4-methyl-1-pentene); acrylic plastic resins; and epoxy resins.

The solvent which forms the solvent solution of such a polymer or copolymer may, for example, be a hydrocarbon having 4 to 10 carbon atoms. Specific examples of the hydrocarbon include aliphatic hydrocarbons such as butane, pentane, hexane, heptane, octane, decane and the linear isomers thereof; alicyclic hydrocarbons such as cyclobutane, cyclopentane, cyclohexane and methylcyclopentane; and aromatic hydrocarbons such as benzene, toluene, xylene, cumene, cymene and ethylbenzene.

The heater B shown in the attached drawing for maintaining the solvent solution of a polymer or copolymer at an elevated temperature may be any heating devive capable of heating the solvent solution in the liquid state under pressure. Heaters of the heat exchanger type are preferred. Heating is done to such an extent that the solvent solution of a polymer or copolymer has a heat energy which permits evaporation of the solvent under the pressure condition of the flashing zone d, that is, under a lower pressure than the pressure of the solvent solution, such as atmospheric pressure to about 5 kg/cm$^2$.gauge, when the solvent solution is flashed into the flashing zone d. The elevated temperature and pressure are, for example, a temperature of about 100° to about 250° C. and a pressure of about 3 to about 40 kg/cm$^2$.G.

The heating temperature may be properly selected depending upon the type of the polymer or copolymer in the solvent solution. For example, in the case of a diene rubber, a temperature of about 130° to about 170° C. may be cited, and in the case of an ethylene/alpha-olefin/diene copolymer, a temperature of about 150° to about 200° C. may be employed.

The pressure of the solvent solution to be treated may be determined depending upon its temperature which is employed depending upon the type of the solvent solution as stated above. The viscosity of the solvent solution is, for example, up to about 10,000 centipoises, preferably about 10 to about 1000 centipoises. In heating the solvent solution, its residence time must be chosen such that undesirable thermal degradation of the polymer or copolymer may not occur. Preferably, the residence time is up to about 10 minutes. In employing a heating device of the heat exchanger type, the solvent solution of polymer or copolymer is desirably passed through it at a linear velocity of at least about 0.3 meter/sec. in order to prevent contamination of its heat transmitting surface. The pressure downstream of the pressure-releasing means is lower than the pressure of the initial solvent solution, for example from atmospheric pressure or a pressure below it to about 5 kg/cm$^2$.G, more specifically about atmospheric pressure to about 5 kg/cm$^2$.G. Preferably, the temperature downstream of the pressure-releasing means is, for example, about 100° to about 200° C. A temperature which may not cause thermal degradation of the polymer or copolymer should be properly chosen. For example, in the case of a diene rubber, this temperature is preferably about 130° to about 170° C., and in the case of an ethylene/alpha-olefin/diene copolymer rubber, it is preferably about 150° to about 200° C.

The following examples specifically illustrate the process of this invention.

EXAMPLE 1

A hexane solution of an ethylene/propylene/dicyclopentadiene copolymer rubber having an ethylene/propylene molar ratio of 68/32, an iodine value of 12 and a Mooney viscosity ($ML_{1+4}$, 100° C.) of 36 (concentration 90 g/liter) was treated by the process of this invention under the following conditions.

| Treating conditions | |
|---|---|
| Amount of the polymer solution treated: | 200 liters/hr |
| Temperature of the solution after heating: | 180° C. |
| Pressure of the solution after heating: | 20 kg/cm$^2$ · G |
| Steam fed: | 10 kg/cm$^2$ · G saturated 14.7 kg/hr (amount fed) |
| Pressure of the pressure-reduced zone: | 1.3 kg/cm$^2$ · G |
| Temperature of the pressure-reduced zone: | 180° C. |

The polymer which left the exit of the flash drying device had a solvent content of 2.8% by weight.

COMPARATIVE EXAMPLE 1

The same procedure as in Example 1 was repeated except that the feeding of steam was omitted. As a result, the polymer which left the exit of the flash-drying device had a solvent content of 5% by weight.

Since according to the process of this invention, the inert stripping agent is fed into the pressure-reduced zone, the solvent can be removed to a greater extent than in the prior art. Moreover, because there is no need to heat the polymer solution to an unduly high temperature, thermal degradation and gellation of the polymer can be prevented.

When the polymer thus subjected to the flash-drying treatment is to be subsequently molded into the desired shape by an extruder, the solvent still remaining in a small amount in the polymer can be completely removed by, for example, operating the vent of a vent-type extruder under reduced pressure.

While solvent removal from a solvent solution of a diene-type rubber (e.g., polyisoprene, polybutadiene, chloroprene, rubber, SBR, NBR) cannot be performed with good results by conventional flash-separating methods because of the poor thermal stability of such rubbers, the process of this invention makes it possible to perform solvent removal of such a solvent solution with a good efficiency without maintaining the heating temperature in a high-pressure zone and the temperature in a lower pressure zone at a high point which may cause thermal degradation of the rubber. Moreover, as compared with an apparatus used in performing a steam stripping method for removal of solvent from a solvent solution of a diene-type rubber, the apparatus used in performing the process of this invention is compact, and very economical in regard to the site and cost of installation.

What we claim is:

1. A flash-drying process for removing a solvent from a liquid solution comprising a solvent and an elastomeric polymer or copolymer dissolved in said solvent and said solution having a viscosity of about 10 to about 10,000 centipoises maintained at an elevated temperature and pressure, which comprises flashing said solution into a flashing zone via a pipeline, said flashing zone being provided in connection to the end of said pipeline and being maintained at a lower pressure than the pressure of the solvent solution through a means for releasing said elevated pressure, and feeding an inert stripping agent into the solution at any point between said pressure-releasing means and said flashing zone, thereby evaporating and separating the solvent from the solution.

2. The process of claim 1 wherein the inert stripping agent is a member selected from the group consisting of water, steam, nitrogen gas, carbon dioxide gas, hydrocarbons having 1 to 4 carbon atoms and mixtures of at least two of these.

3. The process of claim 1 wherein the elastomeric polymer or copolymer is a polymer or copolymer selected from the group consisting of an ethylene/alpha-olefin copolymer rubber, an ethylene/alpha-olefin/diene copolymer rubber, a propylene/alpha-olefin copolymer rubber and diene rubbers.

4. The process of claim 1 wherein the amount of the inert stripping agent fed is about 5 mole% to about 300 mole% based on the total amount of the solvent in the solution.

5. The process of claim 1 wherein the solution is maintained at a temperature of about 100° to about 250° C. and a pressure of about 3 to about 40 kg/cm$^2$.G.

* * * * *

UNITED STATES PATENT AND TRADEMARK OFFICE
CERTIFICATE OF CORRECTION

PATENT NO. : 4,906,329

DATED : March 6, 1990

INVENTOR(S) : Kenichi Tominari, et al.

It is certified that error appears in the above-identified patent and that said Letters Patent is hereby corrected as shown below:

On the face of the patent, delete Related U.S. Application data and insert therefor:

--Continuation of Ser. No. 831,121, Feb. 21, 1986, abandoned, which is a continuation of Ser. No. 521,450, Sep. 9, 1983, abandoned, which is a continuation of Ser. No. 369,824, Apr. 19, 1982, abandoned, which is a continuation of Ser. No. 194,917, Oct. 7, 1980, abandoned.--

Signed and Sealed this

Twentieth Day of August, 1991

Attest:

HARRY F. MANBECK, JR.

*Attesting Officer*  *Commissioner of Patents and Trademarks*